United States Patent
Johnson et al.

(10) Patent No.: US 8,458,384 B2
(45) Date of Patent: Jun. 4, 2013

(54) AUTOMATICALLY LAUNCHING A MEASUREMENT APPLICATION IN RESPONSE TO MEASUREMENT DEVICE CONNECTION

(75) Inventors: Brian M. Johnson, Austin, TX (US);
David E. Wilson, Austin, TX (US);
James G. Smith, Cedar Park, TX (US);
Michael C. Jagen, Cedar Park, TX (US);
Reid K. H. Lee, Cedar Park, TX (US);
Stefanie F. Breyer, Austin, TX (US)

(73) Assignee: National Instruments Corporation, Austin, TX (US)

( * ) Notice: Subject to any disclaimer, the term of this patent is extended or adjusted under 35 U.S.C. 154(b) by 123 days.

(21) Appl. No.: 12/699,133

(22) Filed: Feb. 3, 2010

(65) Prior Publication Data

US 2011/0191509 A1  Aug. 4, 2011

(51) Int. Cl.
*G06F 13/38* (2006.01)
*G06M 11/04* (2006.01)

(52) U.S. Cl.
USPC ............................................. 710/62; 702/127

(58) Field of Classification Search
USPC .......................................................... 710/62
See application file for complete search history.

(56) References Cited

U.S. PATENT DOCUMENTS

| | | | |
|---|---|---|---|
| 5,987,530 A | 11/1999 | Thomson | |
| 6,067,584 A | 5/2000 | Hayles et al. | |
| 6,073,205 A | 6/2000 | Thomson | |
| 6,282,710 B1 | 8/2001 | Boehler | |
| 6,357,021 B1 | 3/2002 | Kitagawa et al. | |
| 6,405,362 B1 | 6/2002 | Shih et al. | |
| 6,412,028 B1 | 6/2002 | Steed et al. | |
| 6,430,000 B1 | 8/2002 | Rent | |
| 6,470,399 B1 | 10/2002 | Tasler | |
| 6,561,428 B2 | 5/2003 | Meier et al. | |
| 6,789,030 B1 | 9/2004 | Coyle et al. | |
| 6,832,271 B1* | 12/2004 | Ivan et al. | 710/15 |
| 7,184,922 B2 | 2/2007 | Ousley et al. | |
| 7,636,799 B2 | 12/2009 | Yang et al. | |
| 7,805,720 B2 | 9/2010 | Chang et al. | |
| 2005/0055690 A1* | 3/2005 | Cornillon et al. | 717/174 |
| 2006/0047465 A1* | 3/2006 | Ousley et al. | 702/127 |
| 2008/0195768 A1* | 8/2008 | Lowe et al. | 710/14 |
| 2008/0244619 A1* | 10/2008 | Jeon et al. | 719/321 |
| 2009/0193152 A1* | 7/2009 | Wang et al. | 710/8 |
| 2011/0010470 A1* | 1/2011 | Hulbert et al. | 710/13 |

OTHER PUBLICATIONS

Jim Seymour, USB 2.0: Not a Minute Too Soon, PCMAG.com, Feb. 5, 2002.
Alfred Poor, Does SCSI Have a Future?, PCMAG.com, Aug. 1, 2001.
DL1620/DL1640/DL1640L Digital Oscilloscope User's Manual (3rd Edition) (Feb. 2003) ("Yokogawa Manual").

* cited by examiner

*Primary Examiner* — Henry Tsai
*Assistant Examiner* — Titus Wong
(74) *Attorney, Agent, or Firm* — Meyertons Hood Kivlin Kowert & Goetzel, P.C.; Jeffrey C. Hood; Joel L. Stevens (57) ABSTRACT

Automatically launching a measurement program in response to measurement device connection. The measurement device may be connected to a host device. The measurement device may store a measurement program. The host device may automatically detect the measurement device. However, a measurement device specific driver may not be required for communication between the host device and the measurement device. The host device may automatically execute the measurement program stored on the measurement device in response to the connecting. During execution, the measurement device may acquire data and provide the acquired data to the host device.

23 Claims, 7 Drawing Sheets

AUTOMATICALLY LAUNCHING A MEASUREMENT APPLICATION IN RESPONSE TO MEASUREMENT DEVICE CONNECTION

FIELD OF THE INVENTION

The present invention relates to the field of measurement, and more particularly to a system and method for automatically launching a measurement program in response to measurement device connection.

DESCRIPTION OF THE RELATED ART

Scientists and engineers often use test, measurement, or automation systems to perform a variety of functions, including measurement of a physical phenomenon or unit under test (UUT), test and analysis of physical phenomena, simulation, hardware-in-the-loop testing, process monitoring and control, control of mechanical or electrical machinery, data logging, and laboratory research, to name a few examples. The devices that interact with the physical systems under analysis may be collectively referred to as "measurement devices".

Measurement devices are often used in conjunction with computer systems. The computer system receives measurement data from the measurement device and performs much of the processing, analysis, or control for the application. Some configuration is usually necessary to make the measurement device work together correctly with the computer system. For example, many measurement devices require specific drivers to be installed on the computer system to enable communication with the measurement device.

However, scientists and engineers are often not highly trained in the art of computer system configuration. Installing the measurement device and associated drivers on the computer system can be a difficult and time-consuming task. Also, the necessary drivers for the measurement device are sometimes not readily available (e.g., when the measurement device is moved to a location in the field and the driver installation CD becomes lost or damaged), which can result in downtime of the measurement system.

Another disadvantage associated with the traditional approach of requiring specific drivers for measurement devices is the cost of developing the drivers. Measurement device vendors may have to develop and test drivers for multiple operating systems and may also have to maintain the drivers or develop new ones as the operating systems evolve.

Improvements in the configuration and installation of measurement devices are therefore desirable.

SUMMARY OF THE INVENTION

Various embodiments are presented of a system and method for automatically launching a measurement program in response to measurement device connection. The measurement device may store a measurement program. The measurement device may be configured to connect to a host device.

The host device may automatically detect the measurement device and may initiate a driver to communicate with the measurement device. However, a measurement device specific driver may not be required for communication between the host device and the measurement device. Instead, the host device may use a generic driver to communicate with the measurement device. For example, the measurement device may be a universal serial bus (USB) device and the host device may use a built in (e.g., built in to the operating system) USB driver to communicate with the measurement device. In some embodiments, the measurement device may be configured to appear as a CD to the host device. For example, the measurement device may be configured to appear as a CD ROM device with a CD loaded into the CD ROM device to the host device. Additionally, the measurement program may be configured to appear as an autorun program of the CD.

Accordingly, the host device may automatically execute the measurement program stored on the measurement device in response to the connection and detection.

During execution of the measurement program, the measurement device may acquire data and provide the acquired data to the host device, e.g., based on user input to the measurement program. However, in further embodiments, the measurement program may be configured to acquire the data automatically, e.g., without the user specifically providing input to acquire the data.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 7,184,922 titled "Measurement Device that Appears as a USB Mass Storage Device," issued on Feb. 2, 2007.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Measurement Data—data generated by a measurement device. For example, the measurement device may receive a signal from a unit under test or a physical system and may generate measurement data based on the signal. The measurement device may be coupled to another device, e.g., a computer system, that receives the measurement data generated by the measurement device.

Live measurement data—measurement data that is generated continuously or quasi-continuously by a measurement device. For example, live measurement data may comprise a stream of data elements (e.g., floating point numbers or other elements) generated in rapid succession by the measurement device. Examples of live measurement data include data that is generated in real time based on a physical signal, e.g., where data values are generated in a live or streaming manner. One specific example of live measurement data is data that represents a continuous waveform.

Figure 1:
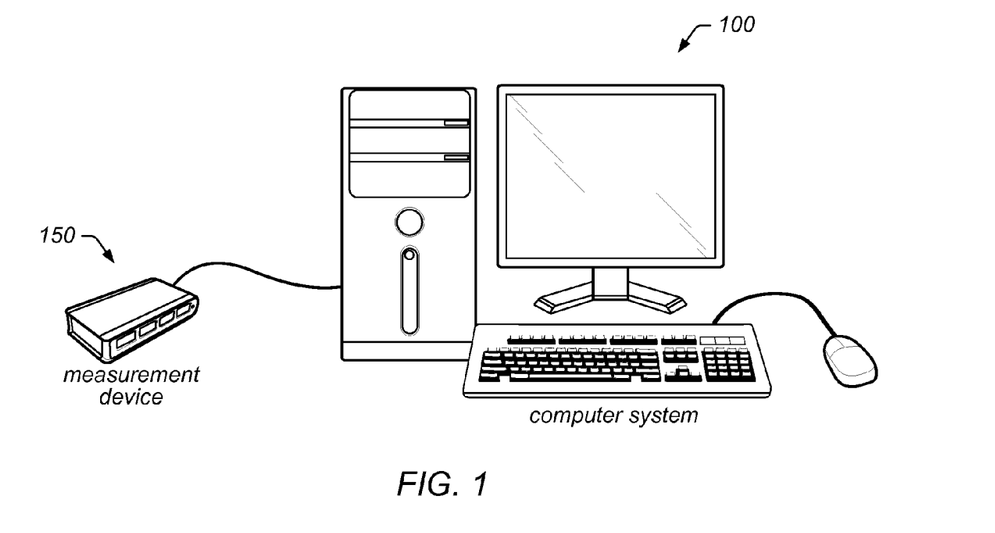
FIG. 1 illustrates a computer system coupled to a measurement device according to an embodiment of the present invention.
Figure 2:
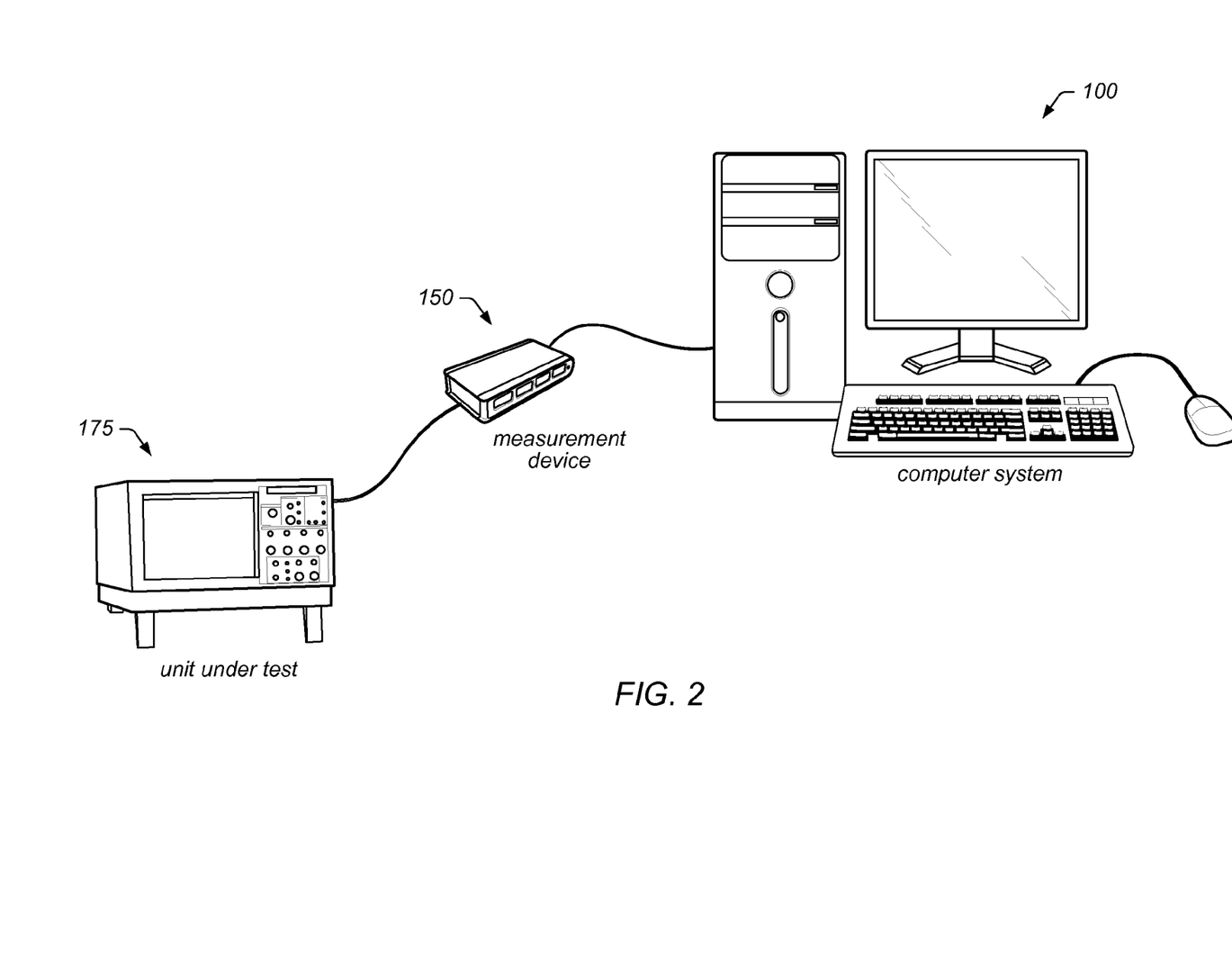
FIG. 2 illustrates a measurement system according to one embodiment of the invention.

FIGS. 1 and 2—Computer System Coupled to a Measurement Device

FIG. 1 illustrates a computer system 100 operable to execute a program that performs a measurement function. This program is also referred to herein as a "measurement program". As shown, a measurement device 150 may be coupled to the computer system 100. The measurement device 150 may perform any of various types of measurements. For example, as shown in FIG. 2, the measurement device 150 may receive a signal from a physical system or unit under test 175 and may generate measurement data based on the signal. However, according to various embodiments, the measurement device 150 may generate measurement data based on any of various kinds of signals received from any of various kinds of physical systems or units under test 175.

As described below, the measurement device 150 may store the measurement program. As also described below, the computer system 100 may automatically execute the measurement program in response to being connected and/or coupled to the measurement device 150.

The measurement program executing on the computer system 100 may receive the measurement data generated by the measurement device 150 and may utilize the measurement data to perform the measurement function. The measurement data may be utilized to perform any of various kinds of measurement functions, such as test and/or analysis of the physical system or unit under test 175, simulation, hardware-in-the-loop testing, process monitoring and control, control of mechanical or electrical machinery, data logging, laboratory research, etc.

The measurement data may be provided from the measurement device 150 to the computer system 100 by any of various methods. For example, in one embodiment, when executing the measurement program, raw data (e.g., live measurement data) may be provided from the measurement device 150 to the computer system 100. Alternatively, the measurement device 150 may be operable to generate one or more files based on the measurement data it generates or receives during execution of the measurement program. The files may comprise files of any kind and may be structured in any desired way. In one embodiment the files may be simple files that simply represent the measurement data itself, e.g., as binary files comprising binary values representing the measurement data values or human-readable text files indicating the measurement data values.

In another embodiment the files may be more structurally complex or may include elements other than the measurement data. For example, the measurement device 150 may be operable to generate: spreadsheet files for particular spreadsheet applications, where the spreadsheet files include the measurement data; HTML, XML, or other markup language files that include the measurement data; a file representing a graph, where the graph visually indicates the measurement data; an executable program file that utilizes the measurement data; etc. These files may also include elements other than the measurement data. For example, an HTML file generated by the measurement device 150 may not only include the measurement data but may also include text or graphic elements, e.g., as in a report file. Thus, in one embodiment the measurement device 150 may differ from traditional measurement devices in that it not only generates the raw measurement data but also applies a higher-level structuring and/or interpretation to the measurement data and generates a file based on the measurement data.

The measurement program executing on the computer system 100 may receive the one or more files generated by the measurement device 150 and may read or analyze the files to perform the desired measurement function. The measurement program may possess knowledge of what kind of files are generated by the measurement device 150 and may be operable to utilize these files accordingly, e.g., to obtain, process, display and/or store the included measurement data. However, as described above, the computer system 100 may receive raw measurement data from the measurement device 150 rather than the described files.

In various embodiments, the measurement device 150 may be coupled to the computer system 100 in any of various ways, and the computer system 100 may communicate with the measurement device 150 using any technique to receive the measurement data generated by the measurement device 150. According to one embodiment, the measurement device 150 may comprise a USB device coupled to a USB bus of the computer system 100. As used herein, the term USB is intended to include prior, current, and future versions of the Universal Serial Bus (USB) standard and similar standards. In one embodiment, the measurement device 150 may appear to the computer system 100 as a USB device of a first type, e.g., as a USB CD ROM device which includes a CD. Accordingly, the computer system 100 may not need to use a measurement device specific driver, but may instead use a built-in driver, e.g., for USB devices. Thus, the computer system 100 may communicate with the measurement device 150 to obtain the measurement data using a generic driver, without requiring a measurement device specific driver to be installed. Note that while a driver is not required in the embodiments described herein, the method may be easily modified such that an installed driver may be used, e.g., one that is automatically installed upon connection of the measurement device 150.

In some embodiments, where files are generated by the measurement device 150, they may appear as files stored on a CD. Alternatively, the measurement device may report itself as more than one device. For example, the measurement device 150 may report itself as a USB hub which has two devices connected, e.g., a CD which stores the measurement program for automatic execution and another device which is usable for obtaining measurement data. In one embodiment, the second device may be a storage device (such as a removable hard drive) that stores the measurement files. Alternatively, the second device may be a human interface device (HID) and the measurement program may be operable to use an HID layer to communicate with the measurement device 150 to obtain the measurement data. A measurement device specific driver may not be required for either of the devices described above.

In another embodiment, the measurement device 150 may not appear to the computer system 100 as a CD but may appear as another type of file storage device, e.g., a file storage device that uses communication standards other than USB. As used herein, a file storage device may comprise a device that appears to a computer system as a device on which files can be stored and/or from which files can be received. For some types of file storage devices, the computer system may be able to automatically detect connection of the file storage device to the computer system and may be operable to automatically configure itself to communicate with the file storage device, e.g., by using a standard file storage device driver provided by or built in to the operating system of the computer system.

Referring again to FIGS. 1 and 2, the computer system 100 may include a display device. For example, a GUI of the measurement program may be displayed on the display device of the computer system 100. The computer system 100 may also include a memory medium(s) on which programs or software components may be stored. For example, the memory medium may store the measurement program executed by the computer system 100. The memory medium may also store operating system software. For example, the operating system may provide support for automatically detecting and communicating with USB devices and/or CD ROM devices or other kinds of devices. In particular, the operating system may include software, e.g., a driver, for communicating with USB Mass Storage devices or other file storage devices. Thus, in an embodiment in which the measurement device 150 conforms to USB Mass Storage specifications or other standard file storage device specifications, the measurement device 150 may advantageously be installed on the computer system 100 without requiring a special driver for the measurement device 150 to be installed. Additionally, the measurement device 150 may store the measurement program, and the computer system 100 may automatically execute the measurement program in response to a connection to the measurement device 150, as described below.

Figure 3:
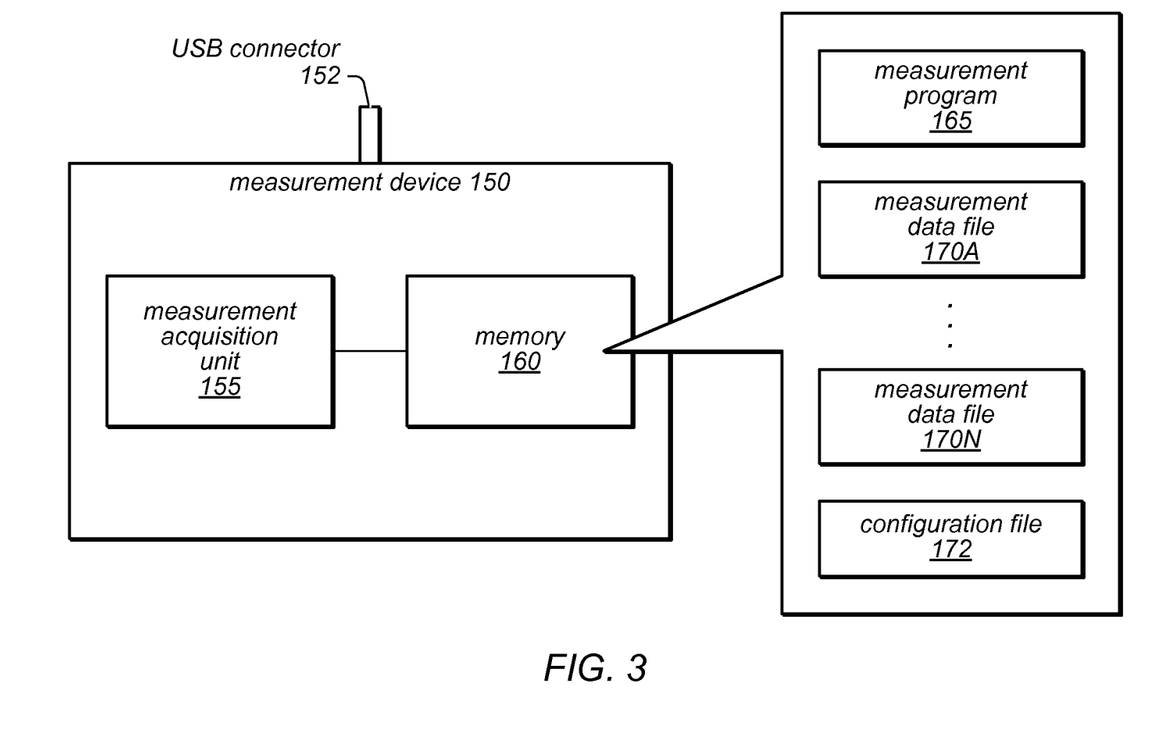
FIG. 3 is a block diagram of an exemplary measurement device, according to one embodiment.

FIG. 3—Measurement Device Block Diagram

FIG. 3 is a block diagram representing one embodiment of the measurement device 150. It is noted that FIG. 3 represents an exemplary embodiment, and alternative architectures are contemplated. As shown, the measurement device 150 may include a measurement acquisition unit 155. The measurement acquisition unit 155 may couple to a physical system or unit under test 175 to receive signals (typically generated by transducers) and may generate measurement data based on the signals, as described above with reference to FIG. 2.

In various embodiments, the measurement acquisition unit 155 may comprise hardware of any kind, depending on the kind of measurement device 150, i.e., depending on the type of signal acquired and type of measurement data generated. The measurement acquisition unit 155 may comprise a device of any kind or may conform to any of various instrumentation standards, such as a data acquisition device with associated signal conditioning circuitry, a GPIB instrument, a VXI instrument, a PXI instrument, a video device or camera with associated image acquisition (or machine vision) hardware, or a motion control device, to name a few examples.

The measurement acquisition unit 155 may also be configured to generate files based on the generated measurement data, as described above. In one embodiment, the measurement device 150 may include a memory 160, and the generated files (shown as 170A-170N) may be stored in the memory 160. For example, FIG. 3 illustrates an embodiment in which various measurement data files 84 are stored in the memory 86. However, as indicated above, measurement files may not be generated and may be transferred to the computer system as raw measurement data, e.g., under the direction of the measurement program 165, which may be stored in the memory 160 and automatically executed by the computer system 100.

In one embodiment the measurement device 150 may also be operable to receive files from an external source, e.g., from the computer system 100 described above. The files may be stored in the memory 160. In one embodiment the measurement device 150 may be configured via a configuration file 172 stored in the memory 160. For example, a user or application on the computer system 100 may create a configuration file 172 that includes various commands, settings, or attributes related to the configuration of the measurement device 150. In response to the configuration file 172 being sent from the computer 100 to the measurement device 150, the measurement device 100 (e.g., the measurement acquisition unit 155) may be operable to analyze the configuration file 172 and configure or control itself according to the commands, settings, or attributes therein.

In various embodiments the memory 160 may comprise a memory medium of any kind. In one embodiment the memory 160 may comprise flash memory. In other embodiments the memory 160 may comprise any other type of memory suitable for storing files, such as RAM, magnetic media, etc.

In one embodiment the measurement device 160 may be engineered so that the memory 160 is detachable from the measurement device 150. Detaching the memory 86 may enable users to replace the memory 160 with another memory 160. This may provide various advantages to users. For example, in one embodiment the memory 160 may comprise a standard and commonly available memory component, such as a Compact Flash™ component, a Memory Stick® component, a Smart Media™ component, an SDCard, a microdrive, a USB memory key, etc. The measurement device 150 may include a slot or compartment for inserting the standard memory component. Such standard memory components are available in different sizes, e.g., 128 MB, 256 MB, 512 MB, 1 GB, 2 GB, 4 GB, 16 GB, etc. Different measurement applications may require different amounts of memory, e.g., depending on factors such as the amount of measurement data generated, the rate at which the measurement program consumes the measurement data, etc. Thus, if the memory 160 is a detachable and commonly available memory component then the user can purchase and attach a memory component of any appropriate size to the measurement device 150. This may also lower the device vendor's cost to produce the measurement device 150 and lower the user's cost to purchase the measurement device 150 since the user may be able to purchase the measurement device 150 without memory and re-use a standard memory component already in his possession as the memory 160.

As described above, in one embodiment, the measurement device 150 may couple to the computer system 100 and appear as a CD ROM device or other standard type of file storage device (e.g., and possibly also as an HID device). As shown in the embodiment of FIG. 3, the measurement device 150 may include a USB connector 152 by which the measurement device 150 can connect to the computer system 100, e.g., via a cable connecting the USB connector 152 to a USB port or hub of the computer system 100. In other embodiments, the measurement device 150 may couple to the computer system 100 in ways other than as a CD ROM device.

Figure 4:
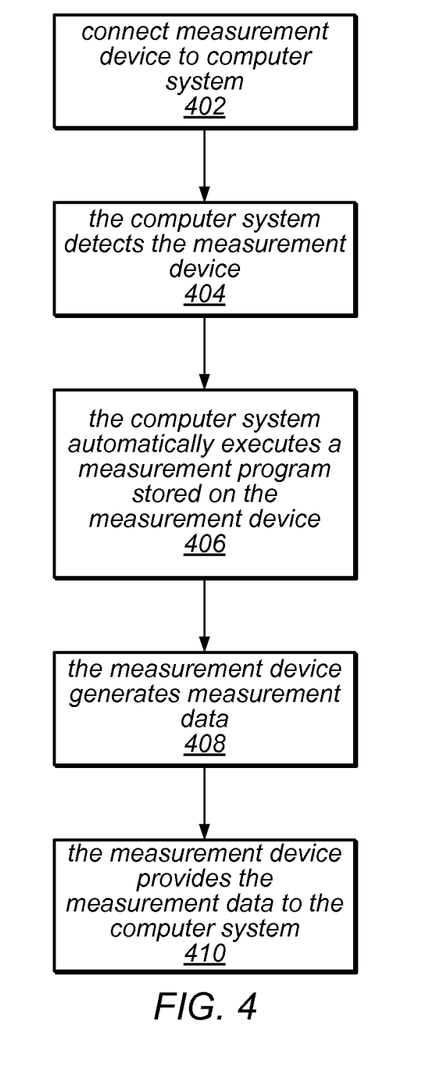
FIG. 4 is a flowchart diagram illustrating one embodiment of a method for automatically launching a measurement program in response to measurement device connection.

FIG. 4—Automatically Launching a Measurement Program Based on Connection

FIG. 4 illustrates a method for automatically launching a measurement program in response to measurement device connection. The method shown in FIG. 4 may be used in conjunction with any of the computer systems or devices shown in the above Figures, among other devices. In various embodiments, some of the method elements shown may be performed concurrently, in a different order than shown, or may be omitted. For example, while the method of FIG. 4 is described with respect to USB devices, the method may be applied to classes of devices other than USB, e.g., firewire, or other communication protocols. Additional method elements may also be performed as desired. As shown, this method may operate as follows.

In 402, the measurement device may be connected to the computer system. For example, the measurement device may be connected to a USB port or hub of the computer system.

In 404, in response to the measurement device being connected, the computer system may detect the measurement device and initiate a query/response protocol with the measurement device to obtain information about the measurement device. The measurement device may inform the computer system that it belongs to the USB "Mass Storage" device class, as well as providing other details that the computer system 82 needs to know to communicate with the measurement device 80.

Accordingly, the computer system 100 may configure itself to communicate with the measurement device as a USB Mass Storage device. As described above, the computer system may execute an operating system that provides built-in support for USB devices, including USB Mass Storage devices. Thus, 404 may involve the computer system configuring itself to communicate with the measurement device using its standard driver for USB Mass Storage devices. This may be advantageous to the user in that he can easily and quickly set up the measurement device on any computer system with an operating system that supports USB devices, without needing to possess or install specialized drivers for the measurement device 150.

In more detail, in one particular embodiment, the measurement device may announce itself as a mass storage device using SCSI-style commands (e.g., SCSI_INQUIRY). In one embodiment, the measurement device may identify itself as a peripheral device type 0x05 (CD-ROM device) with removable media. From there, the OS class driver for mass storage (on the computer system) may issue a plurality of CD-ROM specific commands that inquire about the capacity of the drive and which sectors represent data. Additionally, the computer system may query the measurement device for data from specific sectors of interest. The measurement device may map sectors to the contents of the memory medium of the measurement device which contains an ISO-9660 like image.

Since the layout of the image format is well-defined, the computer system may not "know" that the data is being served from a memory medium other than a CD. Thus, the computer system may not be aware that firmware of the measurement device is simply pretending to be a physical CD.

In further embodiments, the measurement device may also inform the computer system that it is another device, such as an HID. For example, the measurement device may report itself as a USB hub which includes a mass storage device (e.g., a CD ROM device with an inserted CD) as well as another device, which may be used to interact with the measurement features of the measurement device or to retrieve measurement data. Similar to the mass storage device described above, a driver may not be necessary for the second device.

In 406, the computer system may automatically execute the measurement program stored on the measurement device. As used herein, this "automatic execution" means that the user does not specifically request execution of the measurement program. Instead, merely by connecting the measurement device, the measurement program is automatically executed, without any user input requesting the specific execution of the program. However, it is noted that some operating systems may require confirmation of the automatic execution. For example, some Microsoft Windows® operating systems may display a message box which requests that the user confirm automatic execution of the measurement program, where the user can then confirm the execution or cancel the execution of the measurement program. However, it is noted that this confirmation is distinct from the user provided input to specifically execute the measurement program, e.g., by browsing to the directory where the program is stored and then providing user input to execute that program (e.g., by double clicking the program icon). Thus, "automatic execution" may require a confirmation of the execution, but does not require user input to invoke or cause the initial execution of the measurement program (e.g., such as double clicking the program icon, as mentioned above).

In the embodiment described above, where the measurement device appears as a CD ROM device with an inserted CD, the "CD" may include an autorun.inf file in the root directory which identifies the measurement program on the "CD". Accordingly, the OS of the computer system (e.g., Windows®) may automatically execute the measurement program. Thus, by pretending to be a CD, the measurement device may store a measurement program that may be automatically executed in 406. However, it should be noted that the automatic execution may be initiated and/or performed in any of a variety of methods other than the CD embodiment described above. Additionally, this automatic execution may occur without requiring the user to install measurement device specific drivers, thus saving the user typical installation and configuration time.

In 408, during the execution of the measurement program, the measurement device may generate measurement data, e.g., based on one or more signals received from a physical system or unit under test. The measurement data may be generated based on the execution of the measurement program. For example, the measurement program may receive user input to begin test of the unit under test (or perform whatever desired measurement procedure) and correspondingly, the measurement device may begin acquiring and/or generating the measurement data.

In one embodiment, the measurement program may interact with the measurement device by using commands provided to the detected mass storage device, such as the CD. However, where the measurement device is also detected as another device, e.g., an HID, the measurement program may interact with the measurement device through that device. For example, in the case of an HID, the measurement program may provide commands to the measurement device via the HID layer of the OS. Accordingly, the measurement program may control the measurement device, e.g., based on commands received to the measurement program by the user.

In 410, the measurement data may be provided to the computer system. As indicated above, the measurement device may provide the raw measurement data to the computer system or may store the measurement data in measurement data file(s) on the measurement device. As described above, the measurement data file may comprise a file of any kind, such as: a binary file comprising binary values representing the measurement data; a human-readable text file indicating the measurement data; a spreadsheet file for a particular spreadsheet application, where the spreadsheet file includes the measurement data; an HTML, XML, or other markup language file that includes the measurement data; a file including a graph or image, where the graph or image visually indicates the measurement data; an executable program file that utilizes the measurement data; etc. Where provided as files, the files may be provided on the mass storage device, e.g., on the "CD".

Alternatively, the files may be provided via another device, such as a second mass storage device (e.g., represented as a removable hard drive), in embodiments where the measurement device is detected as more than one device. In even further embodiments, the measurement device may be represented as three devices, the mass storage device for launching the measurement program (e.g., the CD described above), a second device for controlling the measurement device (e.g., the HID described above), and a third device for storing generated measurement data (e.g., a removable hard drive). The CD and the removable hard drive may map to a same memory medium of the measurement device or separate memory mediums, as desired.

The measurement program may be operable to process the measurement data in any way, depending on the particular measurement application and the type of measurement data. For example, in one embodiment the measurement program may analyze the measurement data (e.g., the data files) to obtain the measurement data, may display the measurement data in a GUI on a display device of the computer system 82, may utilize the measurement data to perform tests of the physical system or unit under test 150, and/or may store the measurement data in persistent storage, to name a few examples. The measurement program may comprise any program which accesses the measurement data file, possibly including a spreadsheet, an HTML browser, a text file editor/viewer, or any other program which accesses the measurement data file. In one embodiment a standard program provided by the operating system of the computer system 82 may be used as the measurement program to access or view the measurement data file.

Figure 5A:
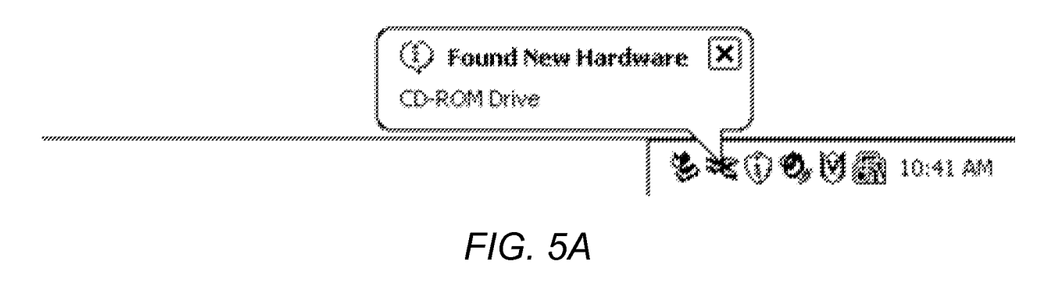
FIGS. 5A-5C are exemplary screen shots corresponding to an embodiment of the method of FIG. 4.
Figure 5B:
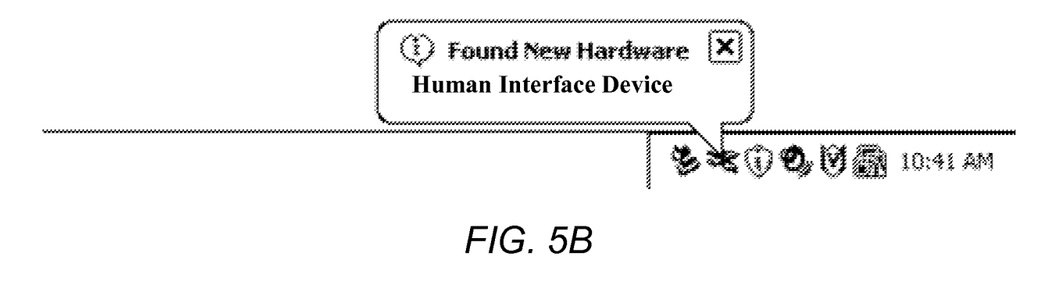
Figure 5C:
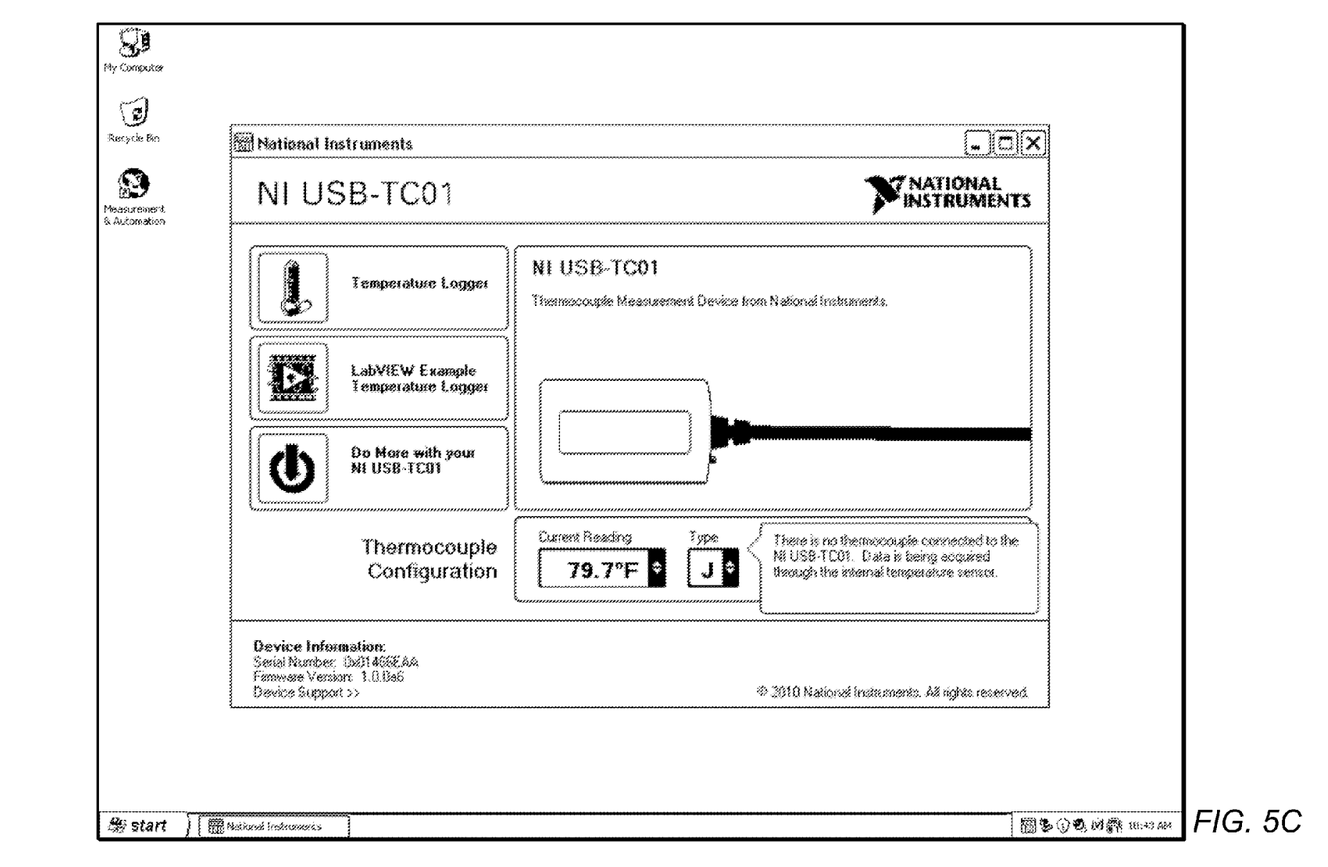

FIGS. 5A-5C—Exemplary Screen Shots Corresponding to the Method of FIG. 4

FIGS. 5A-5C provide exemplary screen shots corresponding to the method of FIG. 4, after connection of the measurement device to the computer system. As shown in FIG. 5A, the measurement device may be detected as a CD-ROM drive. Similarly, following embodiments where the measurement device is detected as two distinct devices, the measurement device may also be detected as a human interface device is FIG. 5B. Thus, in the embodiment of FIG. 5, the measurement device may be detected as a USB CD-ROM device (including a CD) and a USB HID.

After completing enumeration and initial communication, FIG. 5C illustrates a measurement program that is automatically executed after connection of the measurement device. As shown, the program is provided by National Instruments® and is for controlling a thermocouple measurement device. The measurement program has identified that there is no thermocouple connected to the measurement device, and therefore, data is being acquired through the internal temperature sensor.

The user may also see the current reading and type, record data via the temperature logger, view a LabVIEW® example temperature logger, and "do more with your NI USB-TC01". Thus, FIGS. 5A-5C provide exemplary screen shots corresponding to the method described above. Note that these are exemplary only and further modifications and embodiments are envisioned, such as the numerous other embodiments described herein, among others.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method of using a measurement device, comprising:
    detecting, by a host device, connection of the measurement device to the host device, wherein the measurement device stores a measurement program, wherein a measurement device specific driver is not required for communication between the host device and the measurement device, wherein said detecting comprises detecting the measurement device as a plurality of devices, wherein the measurement device is configured to operate as the plurality of devices simultaneously, wherein a first device of the plurality of devices appears to store the measurement program;

the host device automatically executing the measurement program stored on the measurement device in response to said detecting, wherein said automatically executing is performed without user input requesting execution of the measurement program;

wherein the host device automatically executing the measurement program comprises providing commands to a second device of the plurality of devices to cause the measurement device to:
acquire data; and
provide the acquired data to the host device.

2. The method of claim 1, wherein the first device is configured to appear as a CD to the host device.

3. The method of claim 2, wherein the measurement program is configured to appear as an autorun program of the CD.

4. The method of claim 1, wherein the first device is configured to appear as a CD ROM device with a CD loaded into the CD ROM device to the host device.

5. The method of claim 1, further comprising:
the host device initiating a generic driver to communicate with the measurement device.

6. The method of claim 1, wherein the measurement device comprises a universal serial bus (USB) device.

7. A measurement device, comprising:
one or more inputs for acquiring data;
a port for coupling to a host device, wherein the port is coupled to the one or more inputs; and
a memory coupled to the port which stores a measurement program;
wherein the measurement device is configured to:
couple to the host device via the port;
identify itself to the host device as a plurality of devices, wherein a measurement device specific driver is not required for communication between the host device and the measurement device;
operate as the plurality of devices simultaneously, wherein a first device if the plurality of devices appears to store the measurement program, wherein, after coupling, the measurement program is configured for automatic execution by the host device, wherein the automatic execution is performed without user input requesting execution of the measurement program;
acquire data from the one or more inputs based on execution of the measurement program, wherein said acquiring data is performed in response to input to the measurement device via a second device of the plurality of devices; and
provide the acquired data to the host device via the port.

8. The measurement device of claim 7, wherein the first device is configured to appear as a CD to the host device.

9. The measurement device of claim 8, wherein the measurement program is configured to appear as an autorun program of the CD.

10. The measurement device of claim 7, wherein the first device is configured to appear as a CD ROM device with a CD loaded into the CD ROM device to the host device.

11. The measurement device of claim 7, wherein a generic driver is used by the host device to communicate with the measurement device.

12. The measurement device of claim 7, wherein the measurement device comprises a universal serial bus (USB) device.

13. A method of using a measurement device, comprising:
the measurement device coupling to a host device;
the measurement device identifying itself as a plurality of devices to the host device, wherein a measurement device specific driver is not required for communication between the host device and the measurement device
concurrently operate as the plurality of devices, wherein the measurement device stores a measurement program, wherein the first device of the plurality of devices appears to store the measurement program, wherein the measurement program is configured for automatic execution by the host device, wherein the automatic execution is performed without user input requesting execution of the measurement program;
the measurement device acquiring data in response to said executing commands from the measurement program to a second device of the plurality of devices; and
the measurement device providing acquired data to the host device based on said executing the measurement program.

14. The method of claim 13, wherein the first device is configured to appear as a CD to the host device.

15. The method of claim 14, wherein the measurement program is configured to appear as an autorun program of the CD.

16. The method of claim 13, wherein the first device is configured to appear as a CD ROM device with a CD loaded into the CD ROM device to the host device.

17. The method of claim 13, wherein a generic driver is used by the host device to communicate with the measurement device.

18. The method of claim 13, wherein the measurement device comprises a universal serial bus (USB) device.

19. The method of claim 1, wherein the second device is detected as a human interface device (HID) to the host computer.

20. The measurement device of claim 7, wherein the measurement device is configured to identify the second device as a human interface device (HID).

21. The method of claim 13, wherein the measurement device identifying itself as a plurality of devices comprises the measurement device identifying itself as the second device as a human interface device (HID).

22. A non-transitory, computer accessible memory medium storing program instructions executable by a processor of a host device to:
detect connection of a measurement device to the host device, wherein the measurement device stores a measurement program, wherein a measurement device specific driver is not required for communication between the host device and the measurement device, wherein said detecting comprises detecting the measurement device as a pluralitiy of devices, wherein the measurement device is configured to operate as the polurality of devices simultaneously, wherein a first device of the plurality of devices appears to store the measurement program;
automatically execute the measurement program stored on the measurement device in response to said detecting, wherein said automatically executing is performed without user input requesting execution of the measurement program;

wherein the host device automatically executing the measurement program comprises providing commands to a second device of the plurality of devices to cause the measurement device to:
acquire data; and
provide the acquired data to the host device.

23. A non-transitory, computer accessible memory medium storing program instructions executable by a processor of a measurement device to:
in response to the measurement device coupling to a host device, identify the measurement device as a plurality of devices to the host device, wherein a measurement device specific driver is not required for communication between the host device and the measurement device;
concurrently operate as the plurality of devices, wherein the measurement device stores a measurement program, wherein the first device of the plurality of devices appears to store the measurement program, wherein the measurement program is configured for automatic execution by the host device, wherein the automatic execution is performed without user input requesting execution of the measurement program;
acquire data in response to commands from the measurement program to a second device of the plurality of devices; and
provide acquired data to the host device based on said executing the measurement program.

* * * * *

UNITED STATES PATENT AND TRADEMARK OFFICE
CERTIFICATE OF CORRECTION

| | | |
|---|---|---|
| PATENT NO. | : 8,458,384 B2 | Page 1 of 1 |
| APPLICATION NO. | : 12/699133 | |
| DATED | : June 4, 2013 | |
| INVENTOR(S) | : Johnson et al. | |

It is certified that error appears in the above-identified patent and that said Letters Patent is hereby corrected as shown below:

In the Claims:

Claim 13, Column 12, Line 20 please delete "executing commands" and substitute -- commands --.
Claim 22, Column 12, Line 58 please delete "pluralitiy" and substitute -- plurality --.
Claim 22, Column 12, Line 59 please delete "polurality" and substitute -- plurality --.

Signed and Sealed this
Sixth Day of August, 2013

Teresa Stanek Rea
*Acting Director of the United States Patent and Trademark Office*